Oct. 2, 1962 J. G. HART ET AL 3,056,911
PUMP ASSEMBLY
Filed Dec. 15, 1958 2 Sheets-Sheet 2

INVENTORS
John G. Hart
BY Eugene R. Ziegler
*W. E. Finke*
Their Attorney

3,056,911
PUMP ASSEMBLY

John G. Hart, Rochester, and Eugene R. Ziegler, Spencerport, N.Y., assignors to General Motors Corporation, Detroit, Mich., a corporation of Delaware
Filed Dec. 15, 1958, Ser. No. 780,368
3 Claims. (Cl. 318—272)

This invention pertains to pumps, and particularly to an electric motor driven pump which is operated for a predetermined time interval, and hence delivers a predetermined quantity of fluid.

Heretofore, it has been proposed to utilize an electric motor driven centrifugal pump for discharging measured, or predetermined quantities of liquid solvent onto a windshield to effect cleaning thereof. A windshield washer of this type is disclosed in copending application Serial No. 764,120, filed September 29, 1958, now abandoned, in the name of Hart et al. and assigned to the assignee of this invention. The present invention relates to an improved pump assembly of the general type shown in the aforementioned copending application which embodies fewer parts and hence lends itself to more economical manufacture. Accordingly, among our objects are the provision of an electrically operated pump and control means therefor which control operation of the pump for a predetermined time interval; the further provision of an electric motor operated centrifugal pump assembly particularly designed for windshield washers; the further provision of an electric motor driven centrifugal pump assembly including timing means for automatically arresting operation of the pump after a predetermined time interval; and the still further provision of a thermal electric timer for automatically controlling the interval of operation of an electrically operated device.

The aforementioned and other objects are accomplished in the present invention by incorporating a thermostatic timer in the energizing circuit of the electrically operated device. Specifically, the electrically operated device disclosed herein comprises an electric motor for rotating a centrifugal pump impeller. However, the specific centrifugal pump assembly is shown only by way of example and is not to be construed by way of limitation.

In the disclosed embodiment, the motor driven centrifugal pump assembly is supported by the cover of a liquid solvent reservoir and comprises a small electric motor, the shaft of which is connected by means of a resilient coupling to a pump shaft that extends into the reservoir. The pump shaft is enclosed in a support tube, one end of which is suitably attached to and supports a pump housing. The pump housing communicates with the reservoir adjacent the bottom thereof through an inlet port. The pump housing also has an outlet port which may be connected to a delivery conduit. In order to obtain the requisite pressure of the pumped liquid solvent the motor is driven at high speed, for instance 13,000 r.p.m.

The energizing circuit for the motor includes a battery, one terminal of which is connected to ground, and the other terminal of which is connected to one of the commutator brushes. The motor is preferably of the permanent magnet type, and the other commutator brush is connected to one end of a bimetal element. The other end of the bimetal element carries a contact which is engageable with a fixed grounded contact. A resistance coil is wound about the bimetal element, one end of the coil being connected to the contact on the bimetal and the other end being connected to a manually operable push button switch to ground. The thermally responsive bimetal element constitutes a timer, and the timer switch formed by the contact on the bimetal element and the fixed contact is normally open.

To energize the motor, the manually operable push button switch is closed thereby completing a circuit through the bimetal heater and the motor, and when this circuit is closed, the motor is energized at less than full voltage. This is by reason of the fact that the resistance heater is connected in series with the motor. As long as the manually operable push button is maintained closed, the heater will be energized and after a short interval the bimetal element will warp so that the bimetal carried contact will engage the fixed contact thereby establishing a shunt circuit around the resistance heater. At this time, the motor will be energized at full battery voltage, and the push button can be released. The motor will continue to operate for a time interval determined by the characteristics of the bimetal element, and when the bimetal element cools sufficiently it will move back to its original position thereby opening the shunt circuit. Since the motor driven pump operates for a predetermined interval as determined by the characteristics of the bimetal temperature switch, a predetermined quantity of liquid solvent will be discharged during each cycle of operation of the washer pump.

Further objects and advantages of the present invention will be apparent from the following description, reference being had to the accompanying drawings, wherein a preferred embodiment of the present invention is clearly shown.

Figure 1:
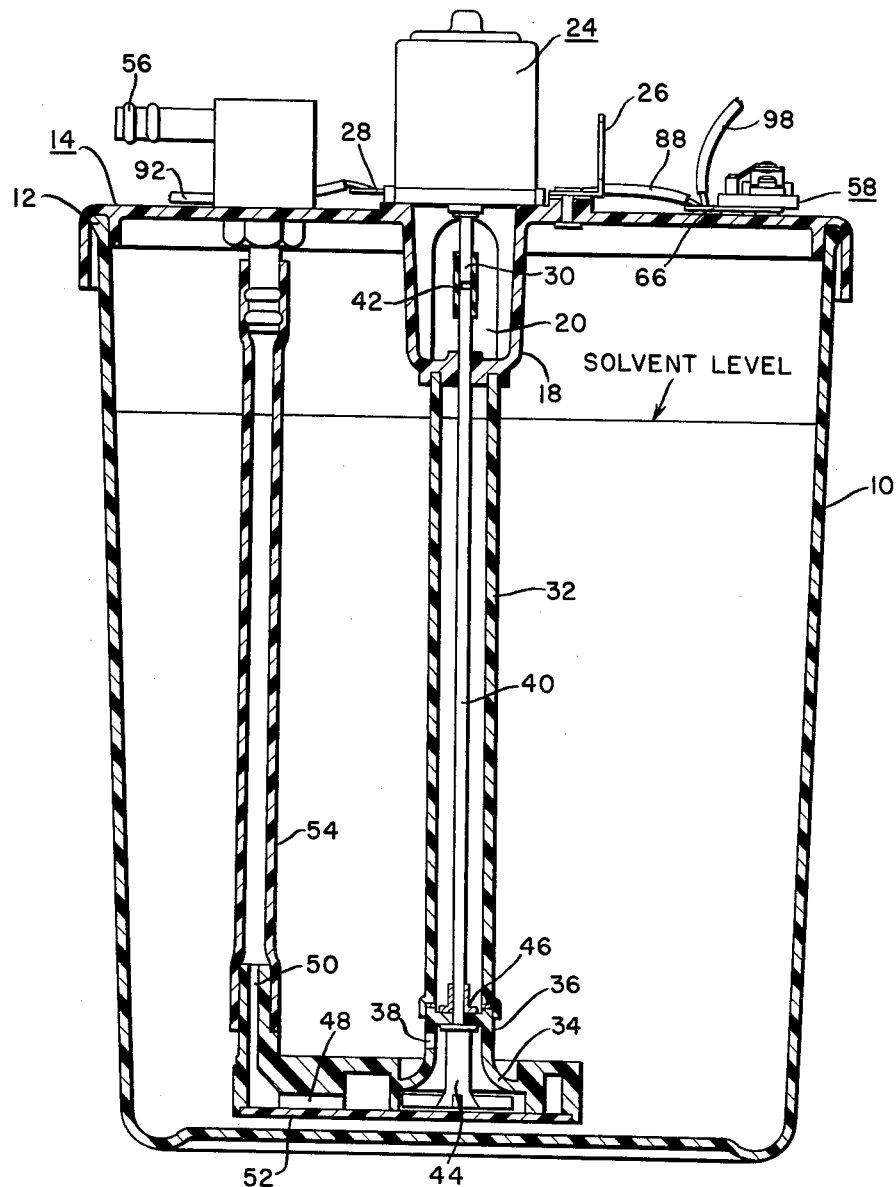
FIGURE 1 is a view, partly in section and partly in elevation, of a pump and reservoir assembly constructed according to the present invention.

With particular reference to FIGURE 1, the pump assembly includes a box-like plastic reservoir 10 having an open top with an enlarged peripheral lip 12. The reservoir is designed to be filled with liquid solvent to the level indicated in FIGURE 1, and the open top is closed by a plastic cover assembly 14 having a peripheral groove adapted to snugly receive the lip 12 of the reservoir 10 so as to retain the cover and the reservoir in assembled relation. The cover 14 may be provided with a conventional fill opening, not shown, which is normally closed by a cap such as shown in the aforementioned copending application.

The cover is formed with a substantially centrally located and downwardly extending projection 18 having one or more elongate side openings 20. A small permanent magnet type direct current electric motor 24 is suitably secured to the cover over the projection 18, the motor having a pair of terminals 26 and 28. The motor includes a drive shaft 30 which extends downwardly into the projection 18.

A plastic support tube 32 has its upper end suitably attached, such as by means of cement, to the projection 18. The lower end of the support tube 32 is cemented to a plastic pump housing 34 having an upstanding bearing boss 36. The pump housing 34 is formed with one or more side openings 38 constituting inlet ports for the pump housing 34.

A pump shaft 40 is connected to the motor shaft 30 by a rubber sleeve type coupling 42. A plastic centrifugal impeller 44 is press fitted onto a portion of the pump shaft 40, the impeller being disposed within the pump housing. A retaining ring 46, attached to the pump shaft 40, engages the bearing boss 36 so as to prevent downward movement of the pump shaft 40 relative to the support tube 32.

The pump housing 34 is formed with an outlet passage 48 which connects with an outlet port 50. The pump housing is closed by a plastic cover 52 cemented to the lower portion thereof. The outlet port 50 is connected to one end of a delivery conduit 54 which is connected with a delivery nipple 56 supported on the cover 14. In a motor vehicle installation, conventional windshield washer nozzles, not shown, are connected by conduit means, not shown, to the nipple 56, and through which the liquid solvent is sprayed onto the windshield of the vehicle.

Figure 2:
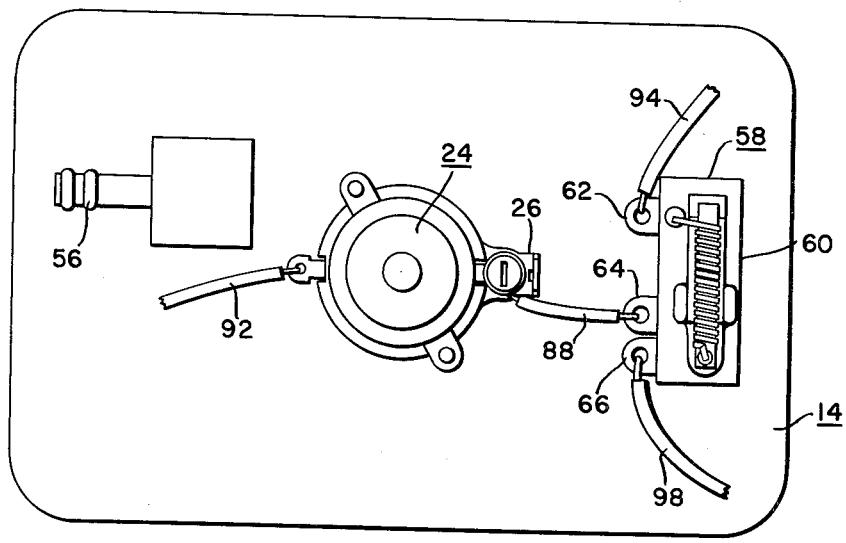
FIGURE 2 is a plan view of the cover and thermal electric timer assembly.
Figure 3:
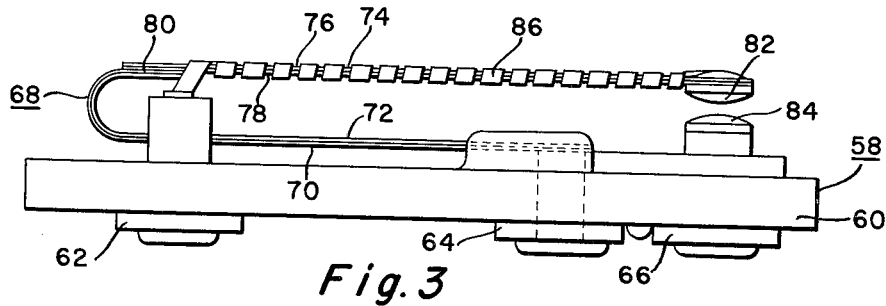
FIGURE 3 is a side view of the thermal electric timer assembly.

With particular reference to FIGURES 1 and 2, a timer assembly generally designated by the numeral 58 is mounted on the cover 14 or elsewhere such as at the dash control. As seen in FIGURES 2 and 3, the timer assembly includes a phenolic base plate 60 having three terminals 62, 64 and 66 riveted thereto. The timer assembly includes a generally U-shaped compensating bimetal strip 68 having a high expansion side 72 and a low expansion side 70 and a substantially flat bimetallic strip 74 having a high expansion side 76 and a low expansion side 78 which is welded at 80 to the compensator bimetallic strip 68. The free end of the bimetallic strip 74 carries a movable contact 82, and a stationary contact 84 is suitably attached to the phenolic base plate 60. The terminal 66 is connected with the fixed contact 84 and the terminal 64 is connected to the compensator bimetallic strip 68. A Nichrome ribbon resistor 86 is wound about the bimetal strip 74, the outer end of the ribbon being welded to the contact 82 and the inner end of the ribbon being welded to the terminal 62. The terminal 26 of the motor 24 is connected by a wire 88 to the terminal 64.

Figure 4:
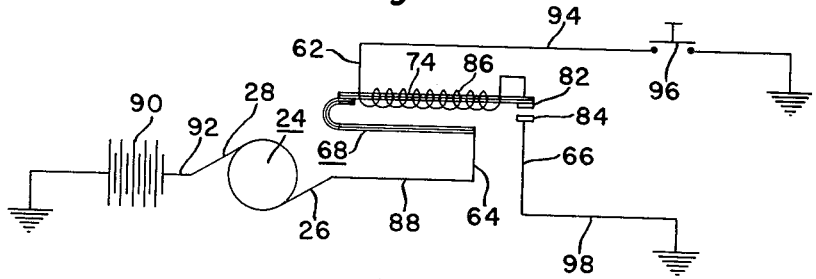
FIGURE 4 is a view of the energizing circuit for the pump motor.

With particular reference to FIGURE 4, the energizing circuit for the motor 24 includes a battery 90, one terminal of which is connected to ground and the other terminal of which is connected by wire 92 to terminal 28 of the motor. The other motor terminal 26 is connected by wire 88 to the timer terminal 64. Timer terminal 62 is connected by a wire to one terminal of the manually operable push button switch 96, the other terminal of which is connected to ground. The timer terminal 66 is connected to ground by wire 98.

Operation of the motor driven pump is as follows. Upon manual closure of the push button switch 96, the motor is energized from battery 90, wire 92, terminal 28, the motor 24, terminal 26, wire 88, terminal 64, the compensator bimetallic strip 68, the switch operating bimetallic strip 74, the resistance heater 86, the terminal 62, the wire 94 and the push button 96. In a typical installation, the armature resistance of the motor may be on the order of 5.5 ohms, and the ohmic value of the heater 86 may be on the order of 1.5 ohms. Assuming the battery to have a terminal voltage of 14 volts, a current of two amperes will flow through the circuit whereupon the resistance wound heater 86 will dissipate 6 watts of power. When the resistance heater 86 is energized, the switch operating bimetal strip 74 will be heated and after a predetermined interval, the bimetal 74 will warp so that contact 82 will engage contact 84.

When contact 82 engages contact 84, the push button circuit including the resistance heater is shorted out by the shunt circuit including ground wire 98, terminal 66, switch contacts 84 and 82, the bimetal element 74. Accordingly, the motor 24 will now be fully energized from the battery 90 and the operator can release the pushbutton 96. Since the motor is not fully energized before the contacts 82 and 84 are closed, the motor will not drive the centrifugal impeller at full speed, and hence as soon as the contacts 82 and 84 are closed, the increased delivery pressure will be immediately apparent to the operator.

Thereafter, the motor 24 will continue to be energized for a predetermined time interval determined by the characteristics of the thermal timer, since as soon as contacts 82 and 84 are in engagement the resistance heater 86 is deenergized and the bimetal strip 74 will cool. Thereafter, after the predetermined time interval the bimetal strip 74 will move back to the position depicted in FIGURE 3 thereby separating contacts 82 and 84 and deenergizing the motor 24 after a predetermined quantity of liquid has been discharged onto the windshield of the vehicle. The push button operated switch 96 may be immediately reclosed to initiate another cycle since the bimetal element 74 will assume the position indicated in FIGURE 3 after completion of the first cycle of washer operation.

While the embodiment of the invention as herein disclosed constitutes a preferred form, it is to be understood that other forms might be adopted.

What is claimed is as follows:

1. Windshield washer actuating and control mechanism including in combination, an electrically actuated washer pump, an energizing circuit for said washer pump including a bimetal operated timer switch, a resistance heater for said bimetal, and an energizing circuit for said resistance heater including a manually operable switch connected in series with said resistance heater, said manually operable switch and said resistance heater being connected in parallel with said timer switch whereby closure of said manually operable switch energizes said resistance heater to cause closure of said bimetal operated timer switch, closure of said timer switch automatically deenergizing said resistance heater and completing the energizing circuit of said washer pump for a predetermined time interval.

2. Windshield washer actuating and control mechanism including in combination, an electrically actuated washer pump, an energizing circuit for said washer pump including a bimetal operated timer switch comprising a stationary contact and a movable contact carried by said bimetal, a resistance heater for said bimetal, and an energizing circuit for said resistance heater including a manually operable switch connected in series with said resistance heater, said manually operable switch and said resistance heater being connected in parallel with said timer switch whereby closure of said manually operable switch energizes said resistance heater to cause deflection of said bimetal so that said movable contact engages said stationary contact to complete the energizing circuit for said washer pump and automatically deenergize said resistance heater, said timer switch remaining closed for a predetermined time interval to continue energization of said washer pump for said predetermined time interval.

3. Windshield washer actuating and control mechanism including in combination, a washer pump, an electric motor for actuating said washer pump, an energizing circuit for said motor including a timer switch including a thermally responsive bimetal strip, a resistance heater for said bimetal strip having one end connected to said bimetal strip, an energizing circuit for said resistance heater including a manual switch connected in series with said resistance heater, said manual switch and said resistance heater being connected in parallel with said timer switch whereby closure of said manual switch effects energization of said resistance heater causing deflection of said bimetal strip to close said timer switch and automatically deenergize said resistance heater, said timer switch continuing energization of said electric motor for a predetermined time interval after automatic deenergization of said resistance heater and subsequent opening of said manual switch and thereafter automatically deenergizing said electric motor.

References Cited in the file of this patent

UNITED STATES PATENTS

| | | | |
|---|---|---|---|
| 2,774,929 | Schaefer | Dec. 18, | 1956 |
| 2,784,876 | Parkes | Mar. 12, | 1957 |
| 2,877,485 | Oishei | Mar. 17, | 1959 |

FOREIGN PATENTS

| | | | |
|---|---|---|---|
| 946,414 | Germany | Aug. 2, | 1956 |
| 1,020,538 | Germany | Dec. 5, | 1957 |